(12) United States Patent
Lu

(10) Patent No.: US 7,747,401 B2
(45) Date of Patent: Jun. 29, 2010

(54) FAST INTRINSIC MODE DECOMPOSITION OF TIME SERIES DATA WITH SAWTOOTH TRANSFORM

(75) Inventor: Yu Lu, Mississauga (CA)

(73) Assignee: Oracle International Corporation, Redwood Shores, CA (US)

( * ) Notice: Subject to any disclaimer, the term of this patent is extended or adjusted under 35 U.S.C. 154(b) by 453 days.

(21) Appl. No.: 11/833,464

(22) Filed: Aug. 3, 2007

(65) Prior Publication Data

US 2009/0037147 A1    Feb. 5, 2009

(51) Int. Cl.
*G01R 13/18* (2006.01)
(52) U.S. Cl. .......................................... 702/66
(58) Field of Classification Search ................. 702/66, 702/67, 70, 71, 73–75, 77, 112, 182, 183, 702/189, 190, 193, 194; 324/309
See application file for complete search history.

(56) References Cited

U.S. PATENT DOCUMENTS

| 4,194,202 | A  | * | 3/1980  | Doyle | 102/214 |
| 7,054,792 | B2 | * | 5/2006  | Frei et al. | 702/190 |
| 7,120,563 | B2 | * | 10/2006 | Bechhoefer et al. | 702/189 |

OTHER PUBLICATIONS

Huang et al., "The empirical mode decomposition and the Hilbert spectrum for nonlinear and non-stationary time series analysis," *Proc. R. Soc. Lond. A.* (1998) 454, pp. 903-995 (93 pages).

Huang, "HHT Tutorial, Nonstationary and Nonlinear Time Series Analysis using the Hilbert-Huang Transform" Presentation, Jul. 21, 2004, (2004) (64 pages).

Johansson, "The Hilbert Transform," (33 pages).

Blakely, "A Fast Empirical Mode Decomposition Technique for Nonstationary Nonlinear Time Series," *Preprint Submitted to Elsevier Science*, Oct. 3, 2005 (2005) (14 pages).

"Hilbert-Huang Transform Technologies," available at http:www.fuentek.com/technologies/hht.htm, printed Aug. 22, 2007 (15 pages).

"Intro—D Programming Language 2.0—Digital Mars," available at http:www.digitalmars.com/d/, printed Aug. 22, 2007 (2 pages).

* cited by examiner

*Primary Examiner*—Mohamed Charioui
(74) *Attorney, Agent, or Firm*—Townsend and Townsend and Crew LLP

(57) ABSTRACT

Embodiments of the present invention provide techniques for decomposing a signal using a sawtooth, or triangle wave, transform. Specific embodiments transform an input signal into a piecewise-linear sawtooth or triangle wave function, and construct upper and lower envelopes for the input signal in sawtooth space. A component function for the input signal (e.g., an Intrinsic Mode Function (IMF)) is then generated based on the sawtooth or triangle wave function and the upper and lower envelopes. In various embodiments, the results generated in sawtooth space are reversely transformed into the original data space of the input signal. In this manner, an input signal may be decomposed into one or more component functions without the time-consuming and relatively unpredictable sifting process of the Empirical Mode Decomposition (EMD) method.

22 Claims, 14 Drawing Sheets

FAST INTRINSIC MODE DECOMPOSITION OF TIME SERIES DATA WITH SAWTOOTH TRANSFORM

BACKGROUND OF THE INVENTION

Embodiments of the present invention relate to data processing, and more particularly relate to techniques for decomposing a signal using a sawtooth, or triangle wave, transform.

Many applications in the field of data/signal processing require the decomposition of an input signal (i.e., data set) into one or more constituent frequency components (i.e., component functions). This decomposition is typically performed using a transform, such as the Fourier transform or the wavelet transform. The frequency components are then used, for example, to analyze or manipulate the input signal in the frequency domain.

One problem with traditional transforms is that they operate over a fixed function base that presumes the linearity and stationarity of the input signal. By way of example, the Fourier transform presumes that the input signal is composed of a summation of simple, sinusoidal functions of varying frequencies. In many cases, this presumption is incorrect. For instance, several types of real-world (i.e., physical) signals, such as time series data collected from physiological phenomena, environmental phenomena, and economic systems are nonlinear and/or nonstationary in nature. As a result, traditional transform techniques such as the Fourier transform and wavelet transform are poorly suited for analyzing these types of signals.

Recent research has led to the development of data analysis methods that overcome some of the deficiencies of fixed function base transforms. One such method, known as the Hilbert Huang Transform (HHT), relies on an adaptive function base to more accurately analyze nonlinear and nonstationary signals. In particular, HHT utilizes a decomposition technique known as Empirical Mode Decomposition (EMD) to decompose an input signal into a series of component functions called Intrinsic Mode Functions (IMFs). Each IMF has a meaningful instantaneous frequency, thereby providing a more accurate physical representation of an input signal that may be nonlinear and/or nonstationary. A detailed discussion of the Hilbert Huang Transform, Empirical Mode Decomposition, and Intrinsic Mode Functions may be found in [Huang, Norden et al., *The Empirical Mode Decomposition and the Hilbert Spectrum for Nonlinear and Nonstationary Time Series Analysis*, Proceedings of the Royal Society of London, A (1998) v. 454, 903-995], which is incorporated herein in its entirety for all purposes.

Although HHT represents an improvement over traditional transform techniques, its corresponding EMD method still had several shortcomings. For example, EMD requires a "sifting" process to approximate the upper and lower envelopes of an input signal. This sifting involves repetitively fitting a cubic spline to the maxima and minima of the input signal until a stopping condition is reached, which can be very time-consuming. Further, since the fitted cubic spline is an approximated, rather than true, envelope of the input function, some overshoot or undershoot may be introduced by the spline interpolation, resulting in an IMF that may not have fully symmetric envelopes. Yet further, selecting the stopping condition for the sifting process is a subjective determination that may result in different IMFs for the same input signal.

BRIEF SUMMARY OF THE INVENTION

Embodiments of the present invention address the foregoing and other such problems by providing techniques for decomposing a signal using a sawtooth, or triangle wave, transform. Specific embodiments transform an input signal into a piecewise linear sawtooth or triangle wave function, and construct upper and lower envelopes for the input signal in sawtooth space. A component function for the input signal (e.g., an IMF) is then generated based on the sawtooth or triangle wave function and the upper and lower envelopes. In various embodiments, the results generated in sawtooth space are reversely transformed into the original data space of the input signal. In this manner, an input signal may be decomposed into one or more component functions without the time-consuming and relatively unpredictable sifting process of the EMD method.

According to one embodiment of the present invention, a method for decomposing a signal into one or more component functions comprises receiving as an input function a signal corresponding to time series data, the signal being represented in an original data space, and decomposing the input function. In various embodiments, the step of decomposing may include transforming the input function into a sawtooth function in sawtooth space; determining an upper envelope by connecting successive maxima of the sawtooth function; determining a lower envelope by connecting successive minima of the sawtooth function; calculating a residue function based on the upper envelope and the lower envelope; calculating a component function based on the residue function and the sawtooth function; and transforming the upper envelope, the lower envelope, the residue function, and the component function from the sawtooth space to the original data space.

In some embodiments, the step of decomposing the input function in the above method is iterated until a predefined condition is reached. One such predefined condition is whether the number of extrema in the input function is less than a predefined threshold. Each iteration may use the residue function calculated and transformed to the original data space in the immediately previous iteration as a new input function.

According to another embodiment of the present invention, a method for decomposing a signal into one or more component functions comprises receiving as an input function a signal corresponding to time series data, the signal being represented in an original data space, and decomposing the input function. In various embodiments, the step of decomposing may include determining one or more sawtooth function components based on the input function, where a maximal difference value between the input function and a summation of the one or more sawtooth function components is less than a predefined value. The step of decomposing may further include, for each sawtooth function component in the one or more sawtooth function components, determining an upper envelope for the sawtooth function component by connecting successive maxima of the sawtooth function component; determining a lower envelope for the sawtooth function component by connecting successive minima of the sawtooth function component; calculating a residue function for the sawtooth function component based on the upper envelope and the lower envelope; and calculating a component function for the sawtooth function component based on the residue function and the sawtooth function component. A residue function for the input function is then calculated by summing the residue functions for the one or more sawtooth function components. Additionally, a component function for the input function is calculated by summing the component functions for the one or more sawtooth function components.

In some embodiments, the step of decomposing the input function in the above method is iterated until a predefined condition is reached. Each iteration may use the residue function for the input function calculated in the immediately previous iteration as a new input function.

In further embodiments, determining one or more sawtooth function components in the method above comprises receiving the input function as input data; transforming the input data into a sawtooth function component; calculating a difference function by calculating the difference between the input data and the sawtooth function component; and determining a maximal difference value between the input data and the sawtooth function component. In various embodiments the steps of transforming, calculating, and determining are iterated until the maximal difference value between the input data and the sawtooth function component is less than the predefined value. Each iteration may use the difference function calculated in the immediately previous iteration as new input data.

According to another embodiment of the present invention, a method for processing a signal in a streaming fashion comprises receiving a portion of a signal, where the portion is less than the entirety of the signal and where the portion comprises data points spanning the extent of at least four contiguous extrema in the signal. The portion is then processed by transforming the portion into a sawtooth function in sawtooth space; determining upper and lower envelopes for the portion based on the sawtooth function; and calculating a component function for the portion based on a residue function and the sawtooth function. In various embodiments, the steps of receiving and processing are iterated for one or more additional portions of the signal until the entire signal has been processed.

In some embodiments, the above method further comprises combining the calculated component functions for the portions of the signal to generate a component function for the signal. The component function for the signal is then transformed from the sawtooth space to an original data space of the signal.

According to another embodiment of the present invention, a system for decomposing a signal into one or more component functions comprises a memory component configured to store a signal corresponding to time series data, the signal being represented in an original data space; and a processing component. The processing component is configured to receive as an input function the signal from the memory component, and decompose the input function. In various embodiments, the decomposing may include transforming the input function into a sawtooth function in sawtooth space; determining an upper envelope by connecting successive maxima of the sawtooth function; determining a lower envelope by connecting successive minima of the sawtooth function; calculating a residue function based on the upper envelope and the lower envelope; calculating a component function based on the residue function and the sawtooth function; and transforming the upper envelope, the lower envelope, the residue function, and the component function from the sawtooth space to the original data space.

According to another embodiment of the present invention, a machine-readable medium for a computer system is disclosed. The machine-readable medium includes instructions which, when executed by a processor, cause the processor to receive as an input function a signal corresponding to time series data, the signal being represented in an original data space, and decompose the input function. In various embodiments, the decomposing may include transforming the input function into a sawtooth function in sawtooth space; determining an upper envelope by connecting successive maxima of the sawtooth function; determining a lower envelope by connecting successive minima of the sawtooth function; calculating a residue function based on the upper envelope and the lower envelope; calculating a component function based on the residue function and the sawtooth function; and transforming the upper envelope, the lower envelope, the residue function, and the component function from the sawtooth space to the original data space.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Embodiments of the present invention provide techniques for decomposing a signal using a sawtooth, or triangle wave, transform. The signal decomposition techniques described below may be applied to different domains and contexts. In one set of embodiments, the techniques may be used to decompose nonlinear and/or nonstationary signals such as those corresponding to time series data collected from real-world phenomena (e.g., communications, sonar, seismic analysis, acoustics, optics, medicine, etc.). In other embodiments, the techniques may be used to more efficiently and accurately decompose linear and/or stationary signals.

Figure 1:
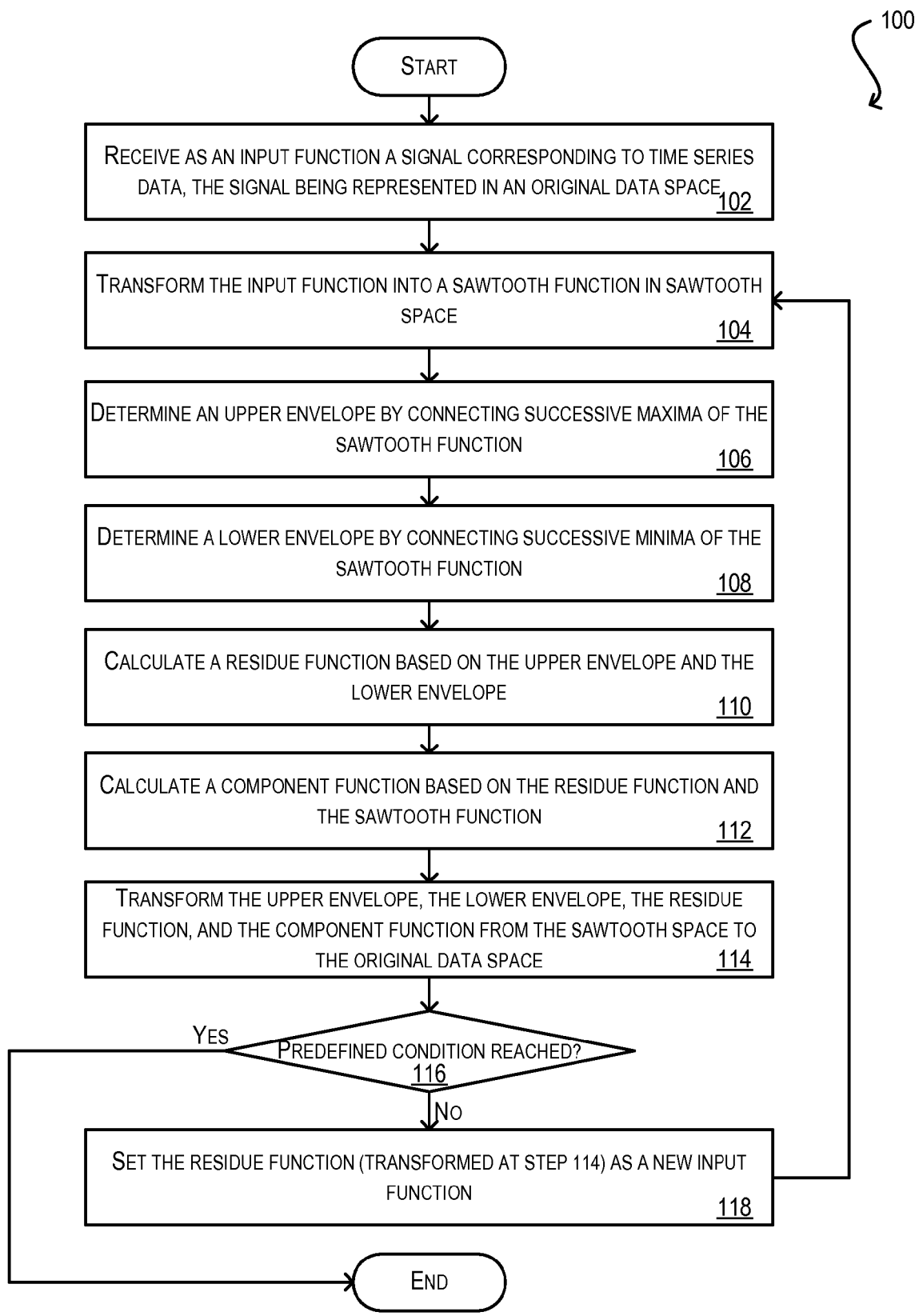
FIG. 1 is a flowchart of a first technique for decomposing a signal in accordance with an embodiment of the present invention.

FIG. 1 depicts a flowchart 100 of a first technique for decomposing a signal in accordance with an embodiment of the present invention. The processing of flowchart 100 may be implemented in software, hardware, or combinations thereof. As software, embodiments of flowchart 100 may be implemented, for example, as a plug-in to an existing data analysis program, or as a standalone program/module. Further, the software may be stored on a machine-readable medium. As hardware, embodiments of flowchart 100 may be, for example, programmed into a field-programmable gate array (FPGA) or fabricated as an application-specific integrated circuit (ASIC). One of ordinary skill in the art would recognize many variations, modifications, and alternatives.

Figure 2:
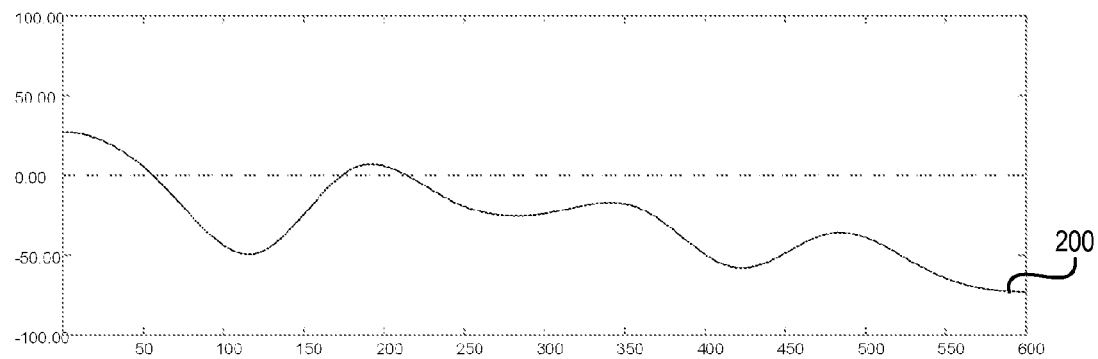
FIG. 2 illustrates a sample signal that may be used in accordance with an embodiment of the present invention.

At step 102, a signal is received as an input function, where the signal is represented in an original data space. In one embodiment, the signal corresponds to time-series data. In other embodiments, the signal may correspond to any other type of data set. FIG. 2 illustrates an exemplary signal 200 that may be used in accordance with the present invention. As shown, signal 200 is both nonlinear and nonstationary (i.e., non-periodic). However, the method of FIG. 1 may also accept as input signals that are linear and/or stationary.

Figure 3:
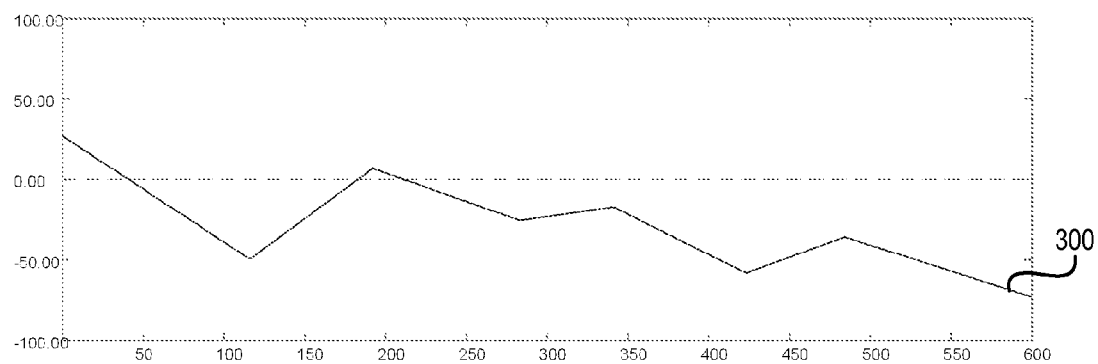
FIG. 3 illustrates a sawtooth, or triangle wave, function for the signal of FIG. 2 in accordance with an embodiment of the present invention.

At step 104, the input function is transformed into a sawtooth, or triangle wave, function in sawtooth space. In one embodiment, this transformation is performed by connecting successive extrema of the input function with straight line segments, where the successive extrema are alternating maxima and minima. FIG. 3 illustrates a sawtooth (triangle wave) function 300 that corresponds to signal 200 of FIG. 2. As shown in FIG. 3, sawtooth function 300 is constructed by connecting the eight extrema of signal 200 with straight line segments to produce a piecewise linear function.

Accordingly to one embodiment, assume that an original signal (i.e., input function) $f(t)$ has m extrema defined as:

$$E(t_j) t_0 \leq t_j \leq t_{m-1}$$

Further, assume that there are k maxima among the m extrema along an upper envelope U(t) of $f(t)$ such that:

$$E(t_{j-1}) < U(t_i) = E(t_j) > E(t_{j+1}) \; 0 \leq i \leq k$$

and l minima among the m extrema along a lower envelope L(t) of $f(t)$ such that:

$$E(t_{j-1}) > L(t_i) = E(t_j) < E(t_{j+1}) \; 0 \leq i \leq l$$

where k is either equal to l or differs from l by one, and k+l=m. Then the resulting sawtooth function s(t) may be defined with m−1 segments as:

$$s(t) = E(t_i) + (E(t_{i+1}) - E(t_i)) \frac{t - t_i}{t_{i+1} - t_i} \quad 0 \leq i < m-1$$

If, in the original data space a data point is designated by (t, x), and in the sawtooth space a data point is designated by (u, s), the sawtooth transform may be defined as:

$$u(t) = t_i + \frac{f(t) - E(t_i)}{E(t_{i+1}) - E(t_i)} (t - t_i) \quad t_i \leq t < t_{i+1} \quad 0 \leq i < m-1$$

$$s(u) = x(t)$$

As shown above, the sawtooth transform may not change the vertical position of a data point in the original signal with respect to signal value (i.e., s(u)). Rather, the transform may modify the horizontal position of one or more data points with respect to time (i.e., u(t)) to convert the original signal into a piecewise linear sawtooth function.

Figure 4:
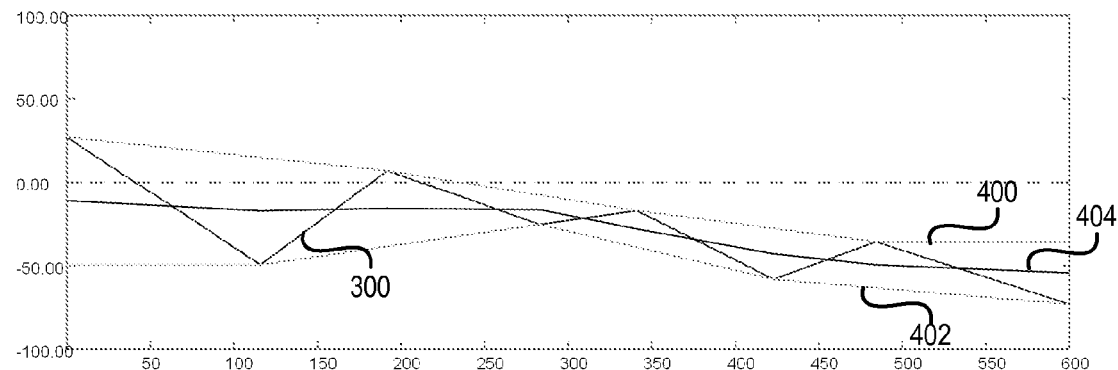
FIG. 4 illustrates an upper envelope, a lower envelope, and a residue function for the sawtooth function of FIG. 3 in accordance with an embodiment of the present invention.

Once the input function has been transformed into a sawtooth function in sawtooth space, an upper envelope is determined by connecting successive maxima of sawtooth function 300 (106), and a lower envelope is determined by connecting successive minima of sawtooth function 300 (108). In one embodiment, the successive maxima and successive minima are connected with straight line segments respectively. Since sawtooth function 300 is piecewise linear, connecting maxima/minima in this manner creates exact envelopes without the need for sifting (as used in EMD). For example, FIG. 4 illustrates an exemplary upper envelope 400 and exemplary lower envelope 402 for sawtooth function 300. As shown, upper envelope 400 corresponds to a piecewise linear function connecting the maxima of sawtooth function 300. Similarly, lower envelope 402 corresponds to a piecewise linear function connecting the minima of sawtooth function 300.

According to one embodiment, an upper envelope U(u) may be determined for input function $f(t)$ as:

$$U(u) = U(u_i) + \frac{U(u_{i+1}) - U(u_i)}{u_{i+1} - u_i} (u - u_i) \quad 0 \leq i < k-1$$

And a lower envelope L(u) may be determined for input function $f(t)$ as:

$$L(u) = L(u_i) + \frac{L(u_{i+1}) - L(u_i)}{u_{i+1} - u_i}(u - u_i) \quad 0 \leq i < l-1$$

To calculate the envelopes and the component function at the boundary points (i.e., starting and ending points) of the input function, the input function may be extended at both ends to improve continuity. There are four possible extensions can be applied around the boundary points: even extension; odd extension; cyclic extension if the starting point and the ending point have equal values; and trend extension which extrapolates the upper and lower envelopes on the first and last cycle.

In some situations, the maxima or minima of sawtooth function 300 may not be single points; rather, they may be a flat ceiling or floor of constant value. In these cases, the entire constant segment may be considered a maxima or minima and may form a part of upper envelope 400 or lower envelope 402 respectively.

At step 110, a residue function is calculated based on the upper and lower envelopes determined at step 108. For example, FIG. 4 illustrates a residue function 404 calculated from upper envelope 400 and lower envelope 402. Generally speaking, residue function 404 represents a trend (i.e., slowly varying portion) of signal 200. In one embodiment, residue function 404 (r(u)) is calculated by taking the mean of upper envelope 400 (U(u)) and lower envelope 402 (L(u)) as follows:

$$r(u) = \frac{U(u) + L(u)}{2}$$

Residue function 404 may also be calculated using other methods. For example, residue function 404 may be calculated by connecting the mid-points of successive line segments of sawtooth function 300. Alternatively, residue function 404 may be calculated by connecting the weight centers of the triangles formed by any consecutive three points of sawtooth function 300. One of ordinary skill in the art would recognize many variations, modifications, and alternatives.

Once the residue function has been calculated, a component function is calculated based on the residue function and the input function (112). Generally speaking, the component function represents an oscillation of the input function (e.g., 200) around the residue function (e.g., 404). In various embodiments, the component function is an Intrinsic Mode Function (IMF).

In one embodiment, a component function c(u) is calculated by taking the difference between a sawtooth function s(u) and a residue function r(u) as follows:

$$c(u) = s(u) - r(u)$$

Figure 5:
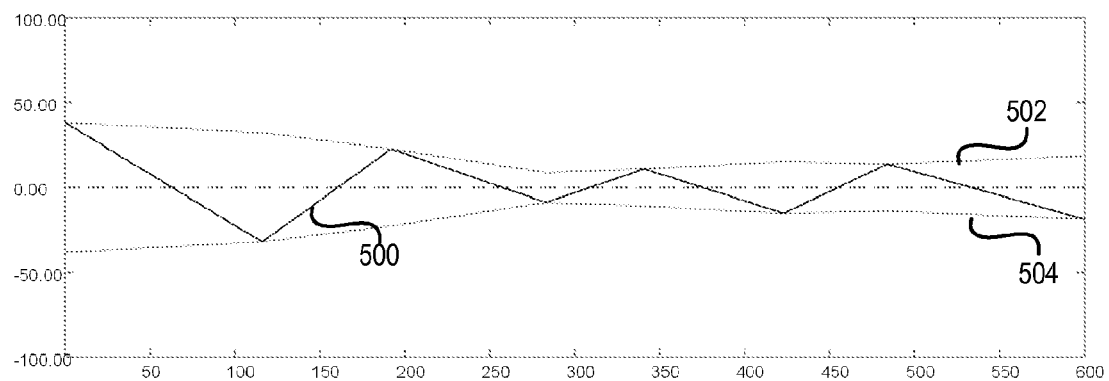
FIG. 5 illustrates a component function for the sawtooth function of FIG. 3 in accordance with an embodiment of the present invention.

For example, FIG. 5 illustrates a component function 500 calculated as the difference between residue function 404 and input function 200. By calculating component function 500 in this manner, the function has symmetric upper and lower envelopes 502 and 504 (as well as a number of zero crossings that differ from the number of extrema by at most one). As a result, component function 500 qualifies as an IMF.

To obtain component function 500, residue function 404, and upper and lower envelopes 400, 402 in the original data space of input function 200, they may be transformed from the sawtooth space back to the original data space (114). In some embodiments, only component function 500 is transformed back. In other embodiments, residue function 404 and envelopes 402, 404 may also be transformed back.

As described previously, the sawtooth transform s(t) generally does not change the vertical position of a data point in the input function with respect to signal value (i.e., s(u)). Rather, the transform modifies the horizontal position of one or more data points with respect to time (i.e., u(t)). Therefore, the reverse transforms generally only require calculating the corresponding time coordinates in the original data space for the time coordinates in the sawtooth space. In one embodiment, these reverse transforms may be defined as:

$$c_{data}(t) = c(u(t))$$

$$r_{data}(t) = r(u(t))$$

$$U_{data}(t) = U(u(t))$$

$$L_{data}(t) = L(u(t))$$

where $c_{data}(t)$ is the reverse transform for component function 500, $r_{data}(t)$ is the reverse transform for residue function 404, $U_{data}(t)$ is the reverse transform for upper envelope 400, and $L_{data}(t)$ is the reverse transform for lower envelope 402.

Figure 6:
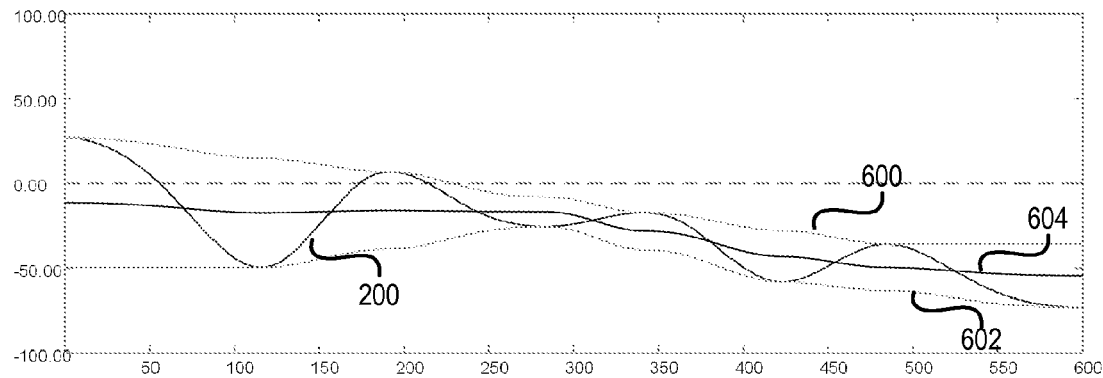
FIG. 6 illustrates the upper envelope, the lower envelope, and the residue function of FIG. 4 after being transformed back to an original data space in accordance with an embodiment of the present invention.
Figure 7:
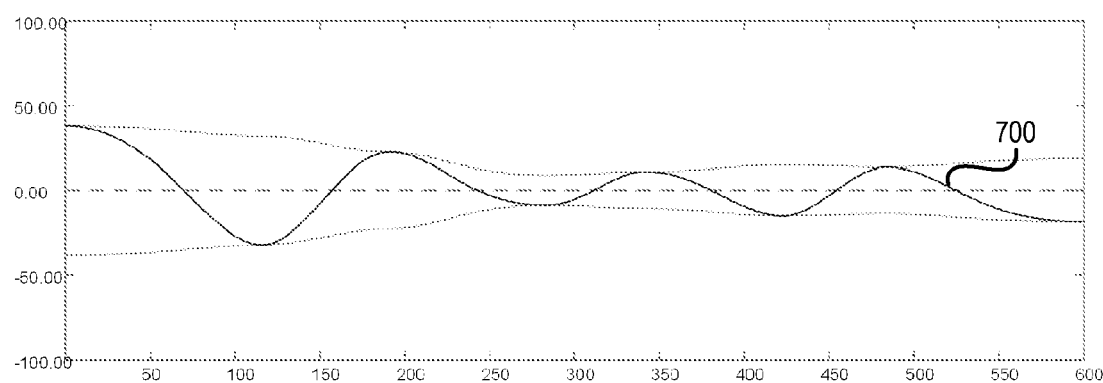
FIG. 7 illustrates the component function of FIG. 5 after being transformed back to an original data space in accordance with an embodiment of the present invention.

In various embodiments, the reverse transforms above do not break the envelope symmetry of component function c(u). Accordingly, $c_{data}(t)$ still satisfies the conditions of an IMF. FIG. 6 illustrates original input function 200 and upper envelope 400 (600), lower envelope 402 (602), and residue function 404 (604) transformed back to the original data space. FIG. 7 illustrates component function 500 (700) transformed back to the original data space.

Once the results have been transformed back to the original data space, a predefined condition may be evaluated to determine whether the input function should not be further decomposed (116). In one embodiment, the condition may be whether the number of extrema in the calculated residue function is less than a predefined threshold. In alternative embodiments, it may be any other condition pertaining to that amount of oscillation remaining in the residue function. If the condition is satisfied, the process of flowchart 100 is completed. If the condition is not satisfied, the residue function transformed at step 114 is set as the new input function, and the entire process returns to step 104. In this manner, an input signal may be decomposed into multiple component functions (e.g., IMFs) and residue functions.

It should be appreciated that the specific steps illustrated in FIG. 1 provide a particular method for decomposing a signal according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
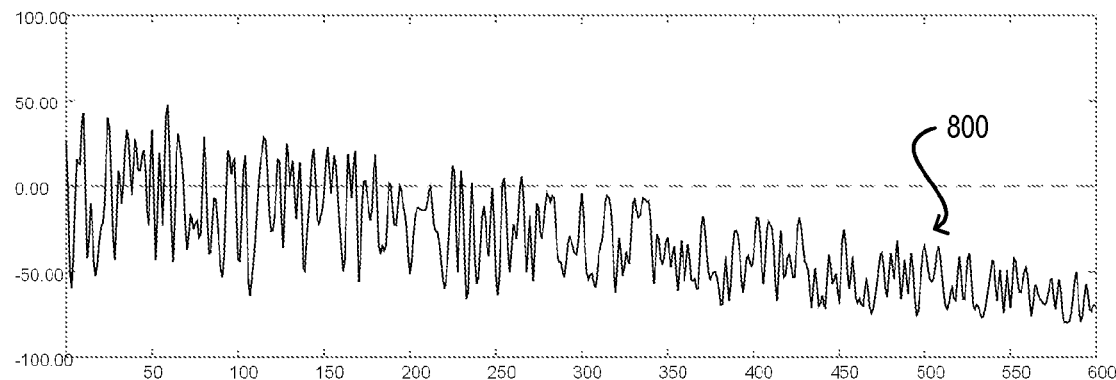
FIG. 8 illustrates a second sample signal that may be used in accordance with an embodiment of the present invention.
Figure 9:
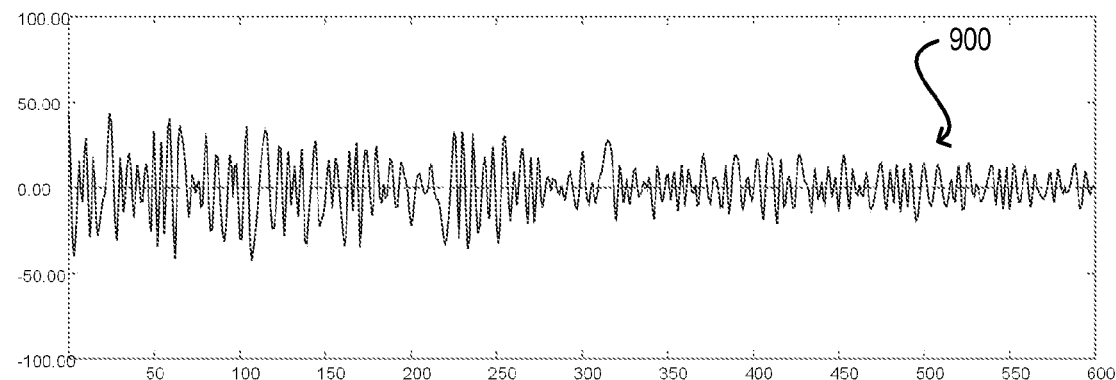
FIG. 9 illustrates a first component function for the signal of FIG. 8 in accordance with an embodiment of the present invention.
Figure 10:
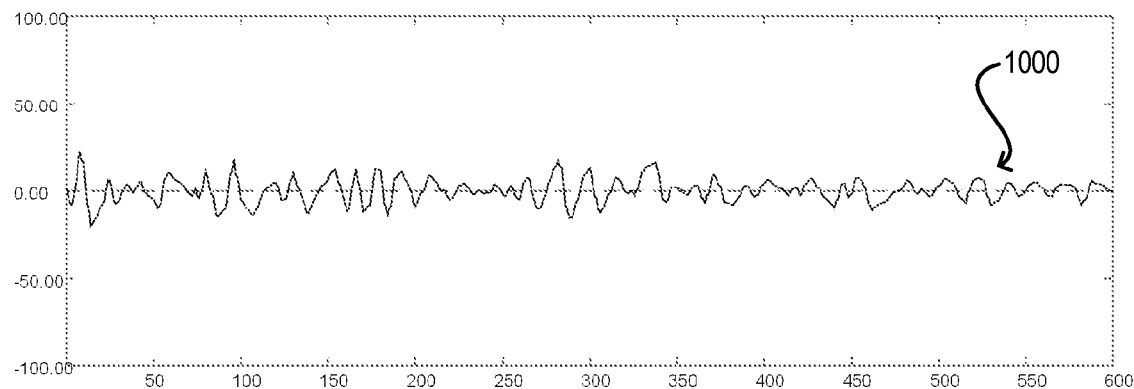
FIG. 10 illustrates a second component function for the signal of FIG. 8 in accordance with an embodiment of the present invention.
Figure 11:
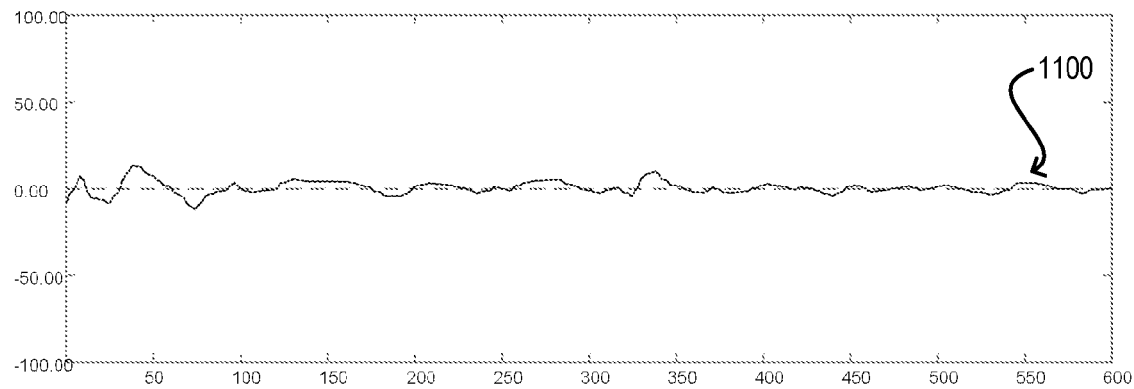
FIG. 11 illustrates a third component function for the signal of FIG. 8 in accordance with an embodiment of the present invention.
Figure 12:
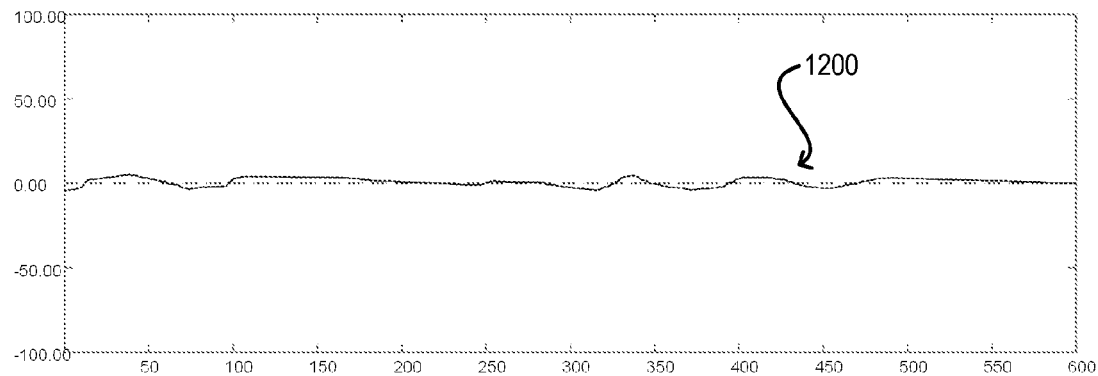
FIG. 12 illustrates a fourth component function for the signal of FIG. 8 in accordance with an embodiment of the present invention.
Figure 13:
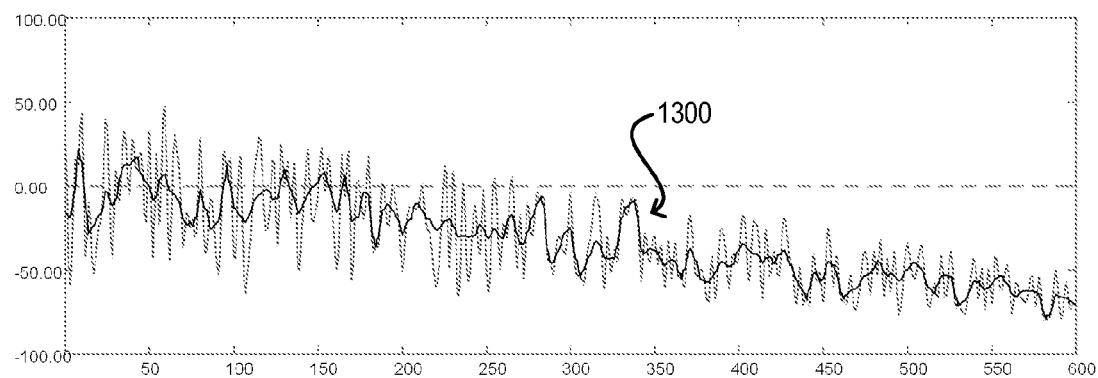
FIG. 13 illustrates a first residue function for the signal of FIG. 8 in accordance with an embodiment of the present invention.
Figure 14:
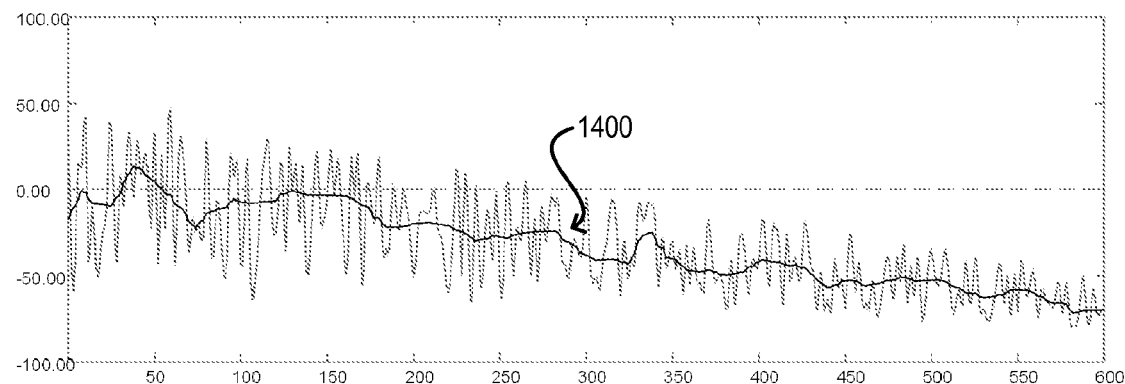
FIG. 14 illustrates a second residue function for the signal of FIG. 8 in accordance with an embodiment of the present invention.
Figure 15:
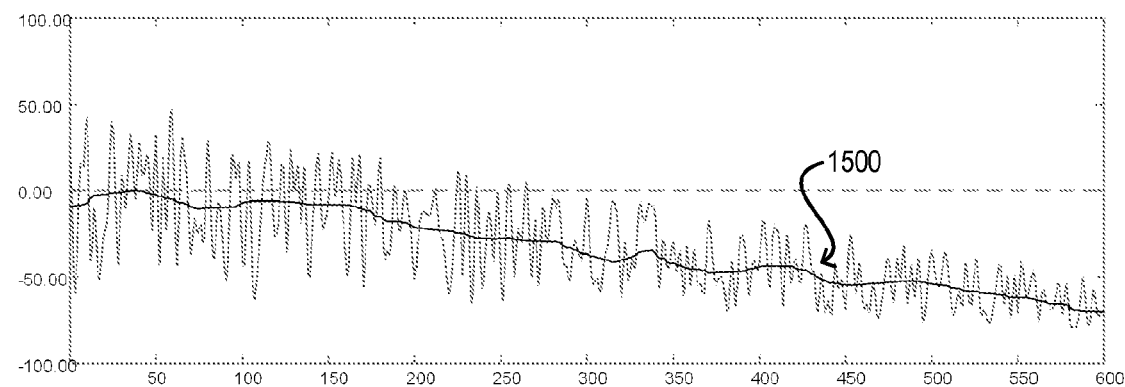
FIG. 15 illustrates a third residue function for the signal of FIG. 8 in accordance with an embodiment of the present invention.
Figure 16:
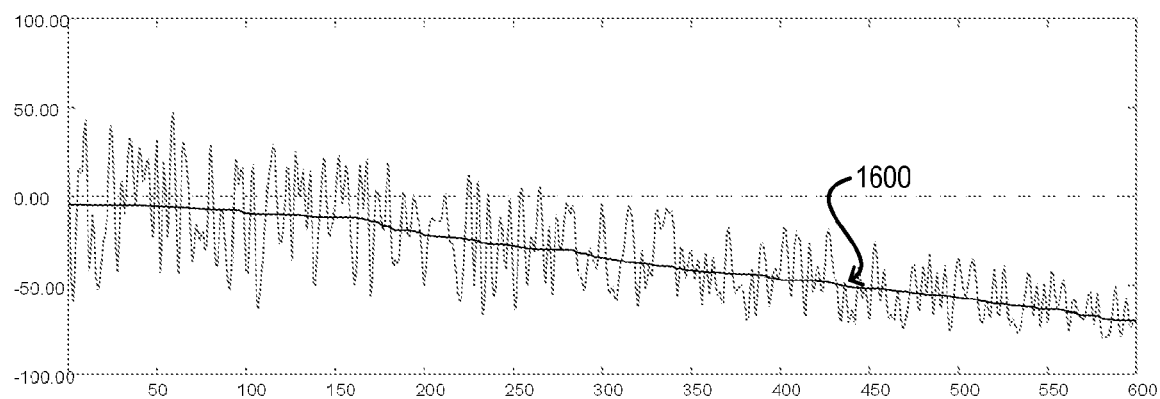
FIG. 16 illustrates a fourth residue function for the signal of FIG. 8 in accordance with an embodiment of the present invention.

FIGS. 8 through 16 illustrate the decomposition of a sample signal 800 into four IMFs and four residue functions in accordance with an embodiment of the present invention. Taken together, the IMFs correspond to the constituent oscillation components of signal 800, and residue functions correspond to its trends. FIG. 8 illustrates the original signal 800.

FIGS. 9, 10, 11, and 12 illustrate the IMFs (900, 1000, 1100, 1200) generated through four successive iterations of method 100. In various embodiments, IMFs 900, 1000, 1100, 1200 represent the fluctuation of signal 800 at different time scales. As shown, the fluctuation rate of the signal decreases for each successive iteration. For example, IMF 900 has 210 extrema, IMF 1000 has 85 extrema, IMF 1100 has 33 extrema, and IMF 1200 has 12 extrema.

FIGS. 13, 14, 15, and 16 illustrate the residue functions (1300, 1400, 1500, 1600) generated through the same four iterations of method 100. In various embodiments, residue functions 1300, 1400, 1500, 1600 represent the trend of signal 800 at different time scales. As shown, the trend of signal 800 approaches a monotonic function for each successive iteration.

Figure 17A:
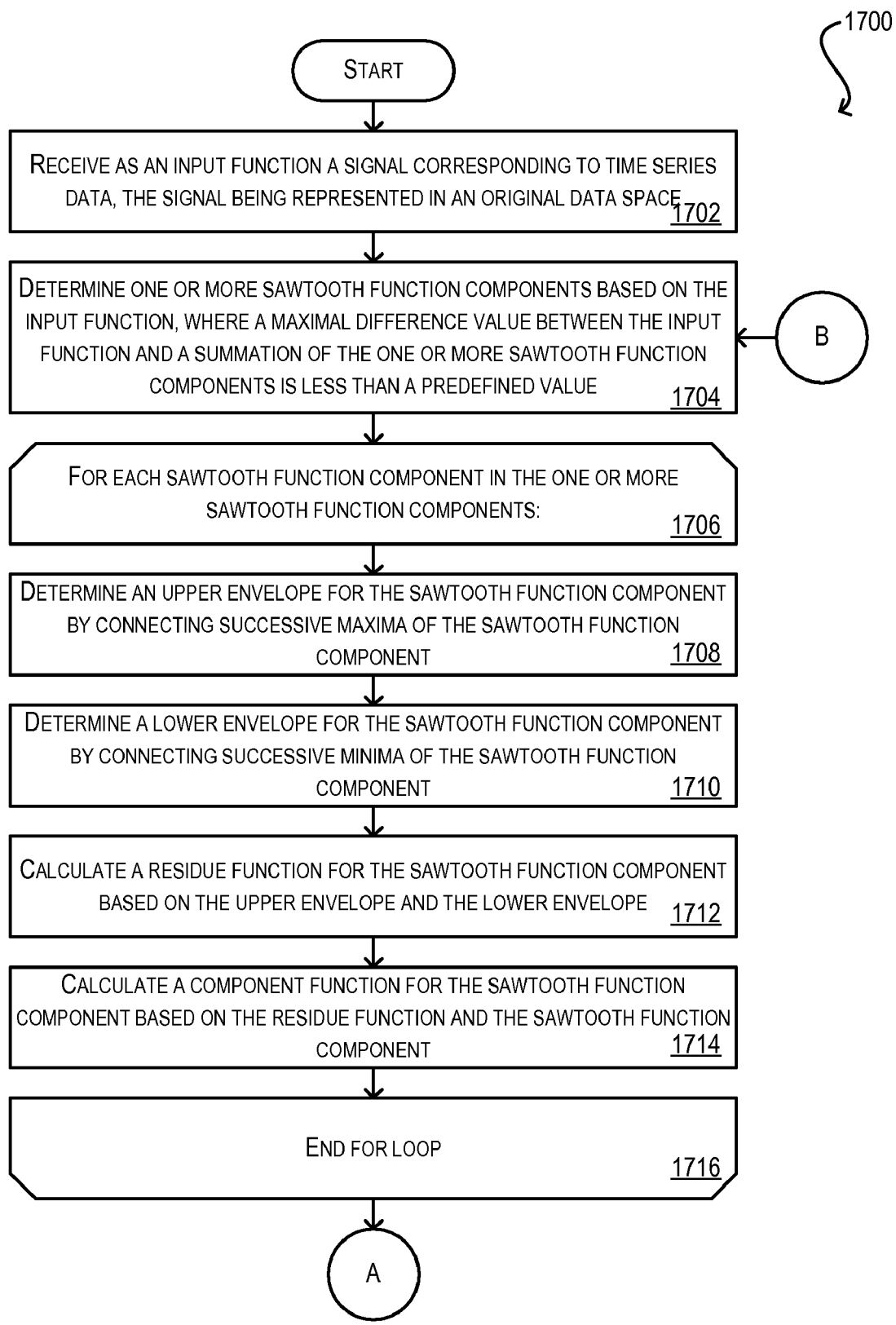
FIGS. 17A, 17B, and 17C are flowcharts of a second technique for decomposing a signal in accordance with an embodiment of the present invention.
Figure 17B:
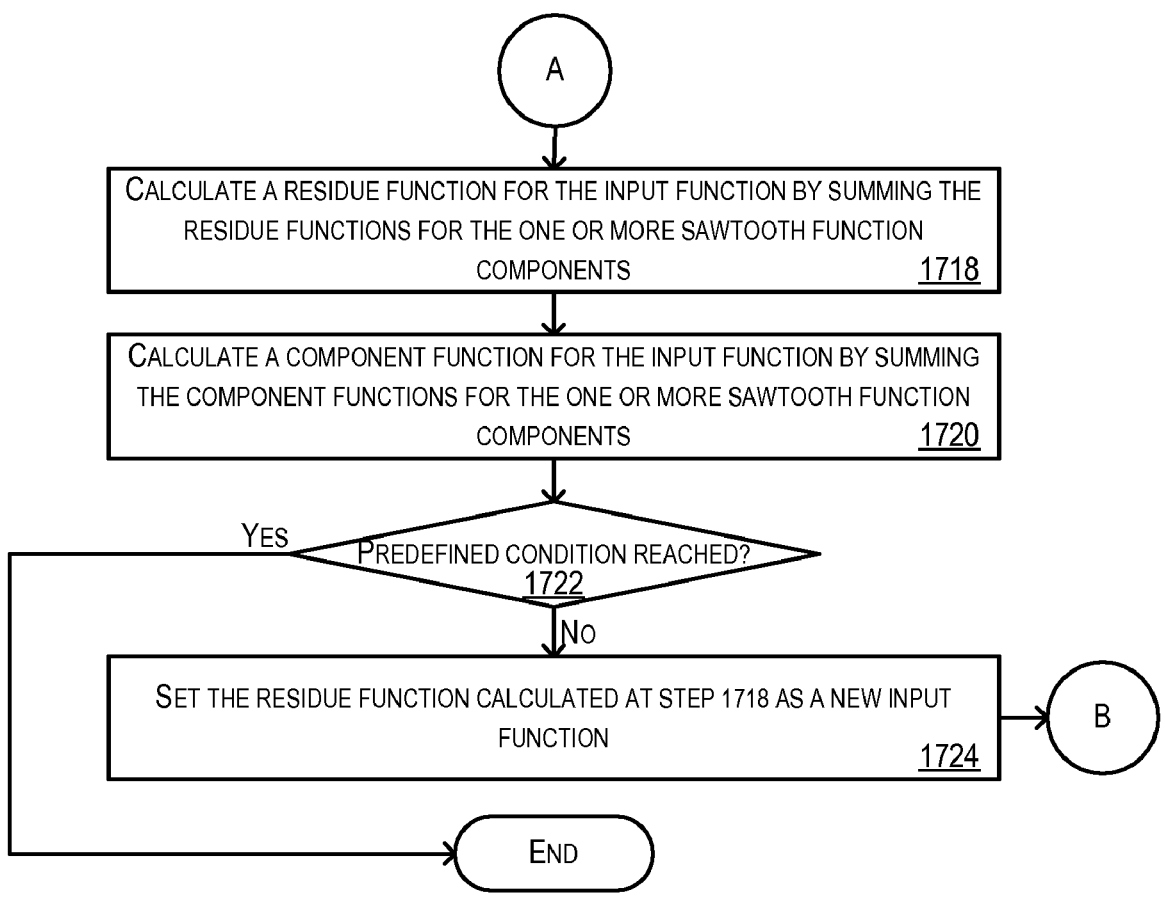
Figure 17C:
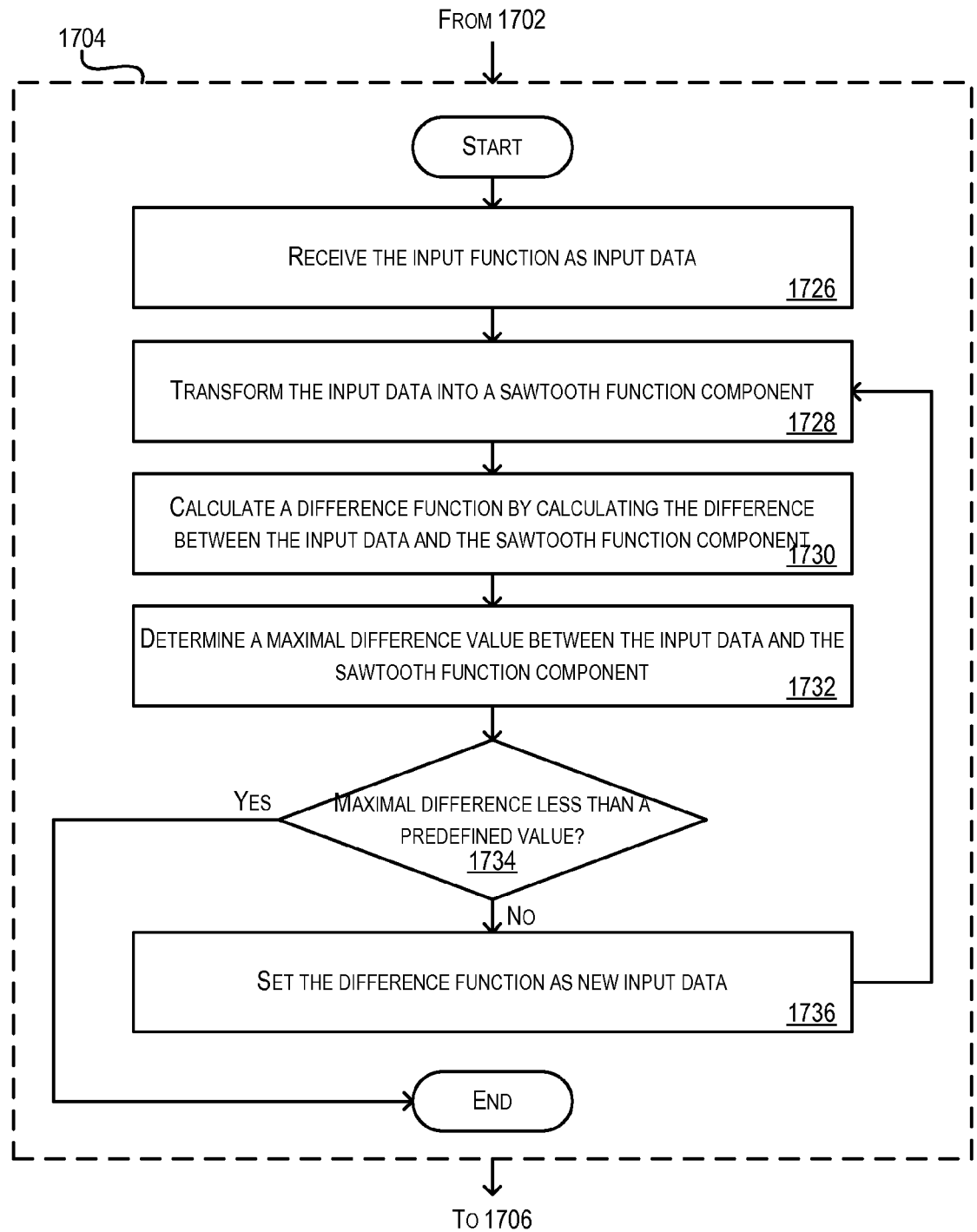

FIGS. 17A, 17B, and 17C illustrate a flowchart 1700 of a second technique for decomposing a signal in accordance with an embodiment of the present invention. Using this alternative technique, one or more component functions for the signal may be determined without having to reversely transform the component functions from a sawtooth space to an original data space. The processing of flowchart 1700 may be implemented in software, hardware, or combinations thereof. As software, embodiments of flowchart 1700 may be implemented, for example, as a plug-in to an existing data analysis program, or as a standalone program/module. Further, the software may be stored on a machine-readable medium. As hardware, embodiments of flowchart 1700 may be, for example, programmed into a field-programmable gate array (FPGA) or fabricated as an application-specific integrated circuit (ASIC). One of ordinary skill in the art would recognize many variations, modifications, and alternatives.

At step 1702, a signal is received as an input function, where the signal is represented in an original data space. In one embodiment, the signal corresponds to time-series data. In other embodiments, the signal may correspond to any other type of data set. FIG. 2 illustrates an exemplary signal 200 that may be used in accordance with the present invention. As shown, signal 200 is both nonlinear and nonstationary (i.e., non-periodic). However, the method of FIGS. 17A, 17B, and 17C may also accept as input signals that are linear and/or stationary.

At step 1704, the input function is decomposed into a series of sawtooth function components, where a maximal difference between the input function and a summation of the sawtooth function components is less than a predefined value. FIG. 17C illustrates one possible implementation of step 1704. At step 1726 of FIG. 17C, the input function is received as input data. The input data is then transformed into a sawtooth function component (1728). This transformation may be performed, for example, in a manner similar to step 104 of FIG. 1. At steps 1730 and 1732, a difference function is calculated by calculating the difference between the input data and the sawtooth function component generated at step 1728, and a maximal difference value between the input data and the difference function is determined. If the maximal difference is less than a predefined value (1734), the processing of step 1704 ends. If the maximal difference is greater than the predefined value, the difference function calculated at step 1730 is set as the new input data (1736), and the processing returns to step 1728 for further iterations. In this manner, a series of sawtooth function components are created for the input function. In various embodiments, the maximal difference between the input function and the summation of all of the sawtooth function components will be less than the predefined value utilized at step 1734.

Returning to FIG. 17A, processing is initiated for each sawtooth function component determined at step 1704 (1706). This processing includes determining an upper envelope for each sawtooth function component by connecting successive maxima of the sawtooth function component (1708), determining a lower envelope for the sawtooth function component by connecting successive minima of the sawtooth function component (1710), calculating a residue function for the sawtooth function component based on the upper and lower envelopes (1712), and calculating a component function for the sawtooth function component based on the residue function and the sawtooth function component (1714). In one embodiment, the processing of steps 1708, 1710, 1712, 1714 are performed in a manner similar to steps 106, 108, 110, 112 of FIG. 1. For example, the residue function for each sawtooth function component may be calculated by taking the mean of the upper and lower envelopes. Additionally, the component function for each sawtooth function component may be calculated by taking the difference between the sawtooth function component and the residue function. However, as discussed with respect to FIG. 1, other implementations of these steps are possible. One of ordinary skill in the art would recognize many variations, modifications, and alternatives.

Once every sawtooth function component has been processed (1716), a residue function for the input function is calculated by summing the residue functions of all of the sawtooth function components (1718 of FIG. 17B). Similarly, a component function for the input function is calculated by summing the component functions for all of the sawtooth function components (1720). Note that steps 1718 and 1720 do not require any reverse transforms from the sawtooth space to the original data space of the input function; rather, the residue function and component function for the input function can be calculated directly from the residue functions and the component functions of the sawtooth function components. In one embodiment, the residue function calculated at step 1718 and the component function calculated at step 1720 will correspond to the true residue function and component function of the input function with a maximal error less than the predefined value utilized at step 1734 of FIG. 17C.

If a predefined condition is reached (e.g., the number extrema in the residue function calculated at step 1718 is less than a predefined value), method 1700 ends. If the predefined condition is not reached, the residue function calculated at step 1718 is set as the new input function, and method 1700 returns to step 1704 for further iterations. In this manner, the original signal may be decomposed into multiple component functions (e.g., IMFs) and residue functions.

It should be appreciated that the specific steps illustrated in FIGS. 17A, 17B, and 17C provide a particular method for decomposing a signal according to an embodiment of the present invention. Other sequences of steps may also be performed according to alternative embodiments. For example, alternative embodiments of the present invention may perform the steps outlined above in a different order. Moreover, the individual steps illustrated in FIGS. 17A, 17B, and 17C may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 18:
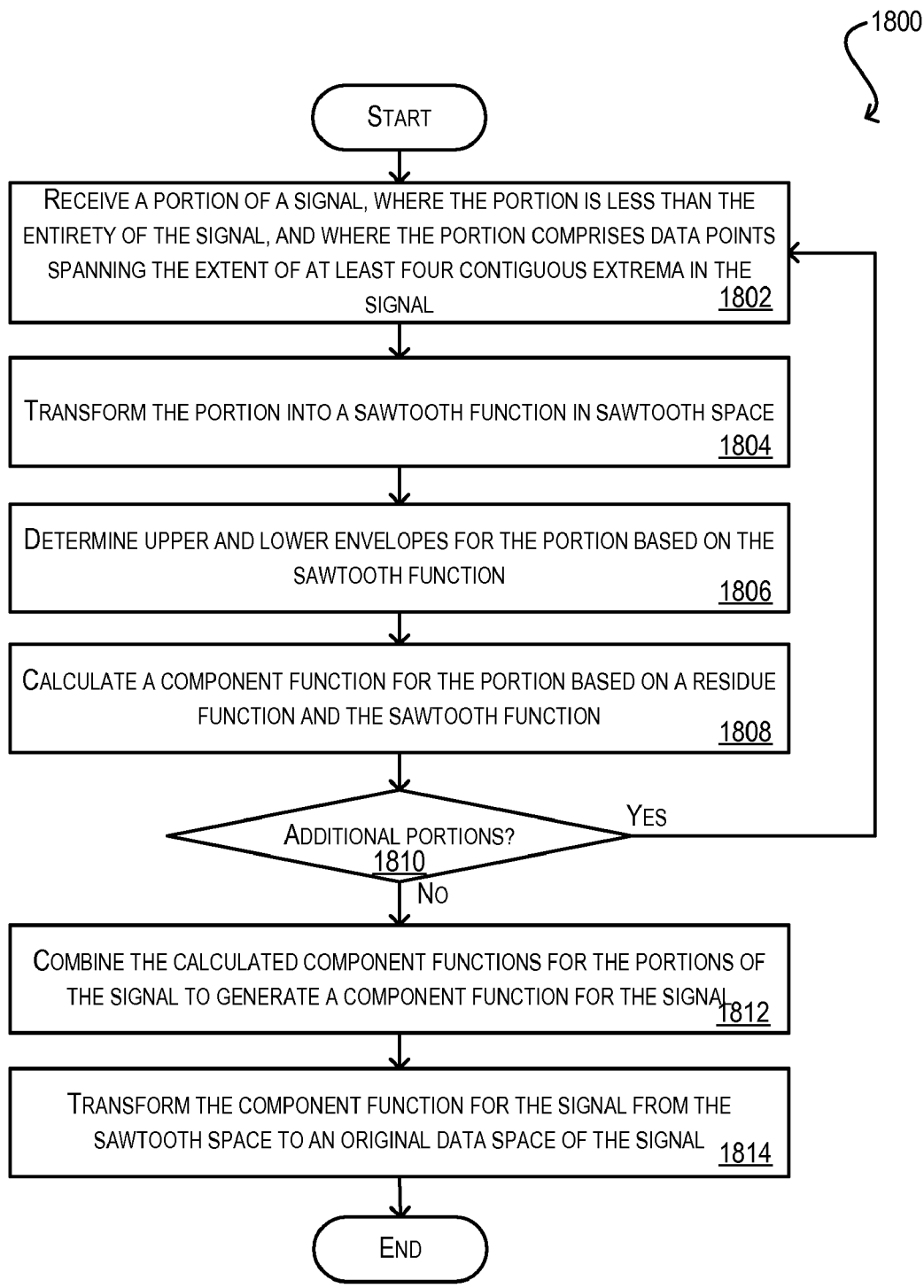
FIG. 18 is a flowchart of a third technique for decomposing a signal in accordance with an embodiment of the present invention.

FIG. 18 is a flowchart 1800 for decomposing a signal in a streaming fashion in accordance with an embodiment of the present invention. This technique may be applied, for example, in scenarios where the data for a signal is collected in real-time, or where the data for the signal is being transmitted from a remote location. In these situations, the processing of flowchart 1800 may begin without waiting for the entire data set of the signal to be received. The technique of FIG. 18 may also be applied in scenarios where high performance or a small memory footprint is required. Since the technique operates on a subset of the input signal at a time, relatively little working memory is needed to decompose the signal.

The processing of flowchart 1800 may be implemented in software, hardware, or combinations thereof. As software, embodiments of flowchart 1800 may be implemented, for example, as a plug-in to an existing data analysis program, or as a standalone program/module. Further, the software may be stored on a machine-readable medium. As hardware, embodiments of flowchart 1800 may be, for example, programmed into a field-programmable gate array (FPGA) or fabricated as an application-specific integrated circuit (ASIC). One of ordinary skill in the art would recognize many variations, modifications, and alternatives.

At step 1802, a portion of a signal is received, where the portion is less than the entirety of the signal, and where the portion comprises data points spanning the extent of at least four contiguous extrema of the signal. In one embodiment, the signal corresponds to time-series data. In other embodiments, the signal may correspond to any other type of data set. FIG. 2 illustrates an exemplary signal 200 that may be used in accordance with the present invention. As shown, signal 200 is both nonlinear and nonstationary (i.e., non-periodic). However, the method of FIG. 18 may also accept as input signals that are linear and/or stationary.

At step 1804, the received portion is transformed into a sawtooth function in sawtooth space. In one embodiment, this transformation is performed in a manner similar to step 104 of FIG. 1. Upper and lower envelopes for the portion are then determined based on the sawtooth function (1806). For example, the upper and lower envelopes may be determined by connecting consecutive maxima and consecutive minima of the sawtooth function respectively. Since the portion comprises at least four contiguous extrema (i.e., two maxima and two minima), the portion will include sufficient data to define upper and lower envelopes.

At step 1808, a component function for the portion is calculated based on a residue function and the sawtooth function. In various embodiments, the residue function and component function are calculated in a manner similar to steps 110 and 112 of FIG. 1. For example, the residue function may be calculated by taking the mean of the upper and lower envelopes. Additionally, the component function may be calculated by taking the difference between the sawtooth function and the residue function. However, as discussed with respect to FIG. 1, other implementations of these steps are possible. One of ordinary skill in the art would recognize many variations, modifications, and alternatives.

If there are additional portions of the input signal (1810), the additional portions are received and processed according to steps 1802-1808. If there are no additional portions, a component function for the signal is generated by combining the calculated component functions of the portions (1812). In further embodiments, a residue function for the signal may also be generated by combining the calculated residue functions of the portions. The component function for the signal (and residue function, if appropriate) may then be transformed from the sawtooth space to the original data space to yield an IMF (and residue function) for the signal in the original data space (1814). In various embodiments, the steps of flowchart 1800 may be repeated multiple times to yield multiple IMFs and residue functions for the signal.

It should be appreciated that the specific steps illustrated in FIG. 18 provide a particular method for decomposing a signal in a streaming fashion according to an embodiment of the present invention. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 19:
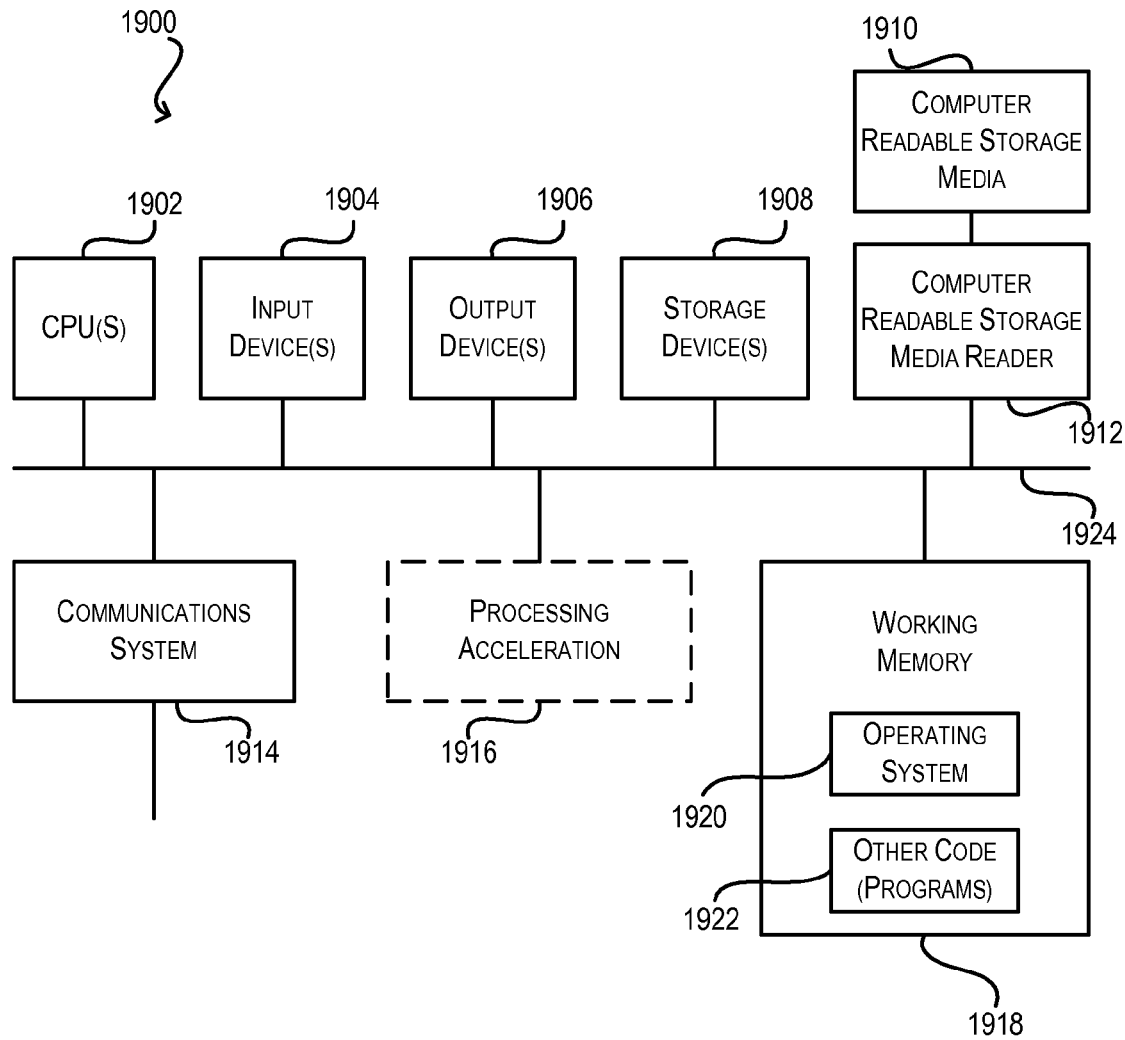
FIG. 19 is a simplified block diagram of a system that may be used in accordance with an embodiment of the present invention.

FIG. 19 illustrates an exemplary computer system 1900 which may be used in accordance with an embodiment of the present invention. Computer system 1900 is shown comprising hardware elements that may be electrically coupled via a bus 1924. The hardware elements may include one or more central processing units (CPUs) 1902, one or more input devices 1904 (e.g., a mouse, a keyboard, etc.), and one or more output devices 1906 (e.g., a display device, a printer, etc.). The computer system 1900 may also include one or more storage devices 1908. By way of example, the storage device(s) 1908 may include devices such as disk drives, optical storage devices, solid-state storage device such as a random access memory ("RAM") and/or a read-only memory ("ROM"), which can be programmable, flash-updateable and/or the like.

The computer system 1900 may additionally include a computer-readable storage media reader 1912, a communications system 1914 (e.g., a modem, a network card (wireless or wired), an infra-red communication device, etc.), and working memory 1918, which may include RAM and ROM devices as described above. In some embodiments, the computer system 1900 may also include a processing acceleration unit 1916, which can include a digital signal processor DSP, a special-purpose processor, and/or the like.

The computer-readable storage media reader 1912 can further be connected to a computer-readable storage medium 1010, together (and, optionally, in combination with storage device(s) 1908) comprehensively representing remote, local, fixed, and/or removable storage devices plus storage media for temporarily and/or more permanently containing computer-readable information. The communications system 1914 may permit data to be exchanged with a network and/or any other computer. For example, computer system 1900 may be part of a larger system/network environment including a plurality of interconnected computer systems.

The computer system 1900 may also comprise software elements, shown as being currently located within a working memory 1918, including an operating system 1920 and/or other code 1922, such as an application program in accordance with embodiments of the present invention. It should be appreciated that alternative embodiments of a computer system 1900 may have numerous variations from that described above. For example, customized hardware might also be used and/or particular elements might be implemented in hardware, software, or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, one of ordinary skill in the art will appreciate other ways and/or methods to implement the various embodiments.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   receiving, by a computer system, as an input function a signal corresponding to time series data, the signal being represented in an original data space; and
   decomposing, by the computer system, the input function, the decomposing comprising:
   transforming, by the computer system, the input function into a sawtooth function in sawtooth space;
   determining, by the computer system, an upper envelope by connecting successive maxima of the sawtooth function;
   determining, by the computer system, a lower envelope by connecting successive minima of the sawtooth function;
   calculating, by the computer system, a residue function based on the upper envelope and the lower envelope;
   calculating, by the computer system, a component function based on the residue function and the sawtooth function; and
   transforming, by the computer system, the upper envelope, the lower envelope, the residue function, and the component function from the sawtooth space to the original data space.

2. The method of claim 1, wherein the step of decomposing the input function is iterated until a predefined condition is reached, each iteration using the residue function transformed to the original data space in the immediately previous iteration as a new input function.

3. The method of claim 2, wherein the predefined condition is whether the number of extrema in the input function is less than a predefined threshold.

4. The method of claim 1, wherein transforming the signal into a sawtooth function comprises:
   determining extrema of the signal; and
   connecting successive ones of the extrema with straight line segments to construct the sawtooth function.

5. The method of claim 1, wherein determining the upper envelope by connecting successive maxima of the input function comprises connecting the successive maxima with straight line segments.

6. The method of claim 1, wherein determining the lower envelope by connecting successive minima of the input function comprises connecting the successive minima with straight line segments.

7. The method of claim 1, wherein calculating the residue function comprises calculating the mean of the upper envelope and the lower envelope.

8. The method of claim 1, wherein calculating the component function comprises calculating the difference between the input function and the residue function.

9. The method of claim 1, wherein the time series data is nonlinear and nonstationary.

10. The method of claim 1, wherein the residue function represents a trend of the signal.

11. The method of claim 1, wherein the component function represents an oscillation of the signal around the residue function.

12. The method of claim 1, wherein the component function is an intrinsic mode function.

13. The method of claim 1, wherein determining the upper envelope or the lower envelope comprises computing a envelope value at a boundary point of the signal by extending the boundary point.

14. A method comprising:
   receiving, by a computer system, a portion of a signal, wherein the portion is less than the entirety of the signal and wherein the portion comprises data points spanning the extent of at least four contiguous extrema in the signal;
   processing, by the computer system, the portion by:
   transforming, by the computer system, the portion into a sawtooth function in sawtooth space;
   determining, by the computer system, upper and lower envelopes for the portion based on the sawtooth function; and
   calculating, by the computer system, a component function for the portion based on a residue function and the sawtooth function; and
   iterating, by the computer system, the steps of receiving and processing for one or more additional portions of the signal until the entire signal has been processed.

15. The method of claim 14, wherein the residue function is the mean of the upper and lower envelopes.

16. The method of claim 15, wherein calculating the component function comprises calculating the difference between the sawtooth function and the residue function.

17. The method of claim 14 further comprising:
   combining the calculated component functions for the portions of the signal to generate a component function for the signal; and
   transforming the component function for the signal from the sawtooth space to an original data space of the signal.

18. A method comprising:
   receiving, by a computer system, as an input function a signal corresponding to time series data, the signal being represented in an original data space; and
   decomposing, by the computer system, the input function, the decomposing comprising:
   determining, by the computer system, one or more sawtooth function components based on the input function, wherein a maximal difference value between the input function and a summation of the one or more sawtooth function components is less than a predefined value;

for each sawtooth function component in the one or more sawtooth function components:
  determining, by the computer system, an upper envelope for the sawtooth function component by connecting successive maxima of the sawtooth function component;
  determining, by the computer system, a lower envelope for the sawtooth function component by connecting successive minima of the sawtooth function component;
  calculating, by the computer system, a residue function for the sawtooth function component based on the upper envelope and the lower envelope; and
  calculating, by the computer system, a component function for the sawtooth function component based on the residue function and the sawtooth function component;

calculating, by the computer system, a residue function for the input function by summing the residue functions for the one or more sawtooth function components; and calculating, by the computer system, a component function for the input function by summing the component functions for the one or more sawtooth function components.

19. The method of claim 18, wherein the step of decomposing the input function is iterated until a predefined condition is reached, each iteration using the residue function for the input function calculated in the immediately previous iteration as a new input function.

20. The method of claim 18, wherein determining one or more sawtooth function components based on the input function comprises:
  receiving the input function as input data;
  transforming the input data into a sawtooth function component;
  calculating a difference function by calculating the difference between the input data and the sawtooth function component;
  determining a maximal difference value between the input data and the sawtooth function component; and
  iterating the steps of transforming, calculating, and determining until the maximal difference value between the input data and the sawtooth function component is less than the predefined value, each iteration using the difference function calculated in the immediately previous iteration as new input data.

21. A system for decomposing a signal into one or more component functions, the system comprising:
  a memory component configured to store a signal corresponding to time series data, the signal being represented in an original data space; and
  a processing component configured to:
    receive as an input function the signal from the memory component; and
    decompose the input function, the decomposing comprising:
      transforming the input function into a sawtooth function in sawtooth space;
      determining an upper envelope by connecting successive maxima of the sawtooth function;
      determining a lower envelope by connecting successive minima of the sawtooth function;
      calculating a residue function based on the upper envelope and the lower envelope;
      calculating a component function based on the residue function and the sawtooth function; and
      transforming the upper envelope, the lower envelope, the residue function, and the component function from the sawtooth space to the original data space.

22. A non-transitory machine-readable medium for a computer system, the machine-readable medium having stored thereon a series of instructions which, when executed by a processing component, cause the processing component to decompose a signal into one or more component functions by:
  receiving as an input function a signal corresponding to time series data, the signal being represented in an original data space; and
  decomposing the input function, the decomposing comprising:
    transforming the input function into a sawtooth function in sawtooth space;
    determining an upper envelope by connecting successive maxima of the sawtooth function;
    determining a lower envelope by connecting successive minima of the sawtooth function;
    calculating a residue function based on the upper envelope and the lower envelope;
    calculating a component function based on the residue function and the sawtooth function; and
    transforming the upper envelope, the lower envelope, the residue function, and the component function from the sawtooth space to the original data space.

* * * * *

UNITED STATES PATENT AND TRADEMARK OFFICE
CERTIFICATE OF CORRECTION

PATENT NO. : 7,747,401 B2
APPLICATION NO. : 11/833464
DATED : June 29, 2010
INVENTOR(S) : Yu Lu It is certified that error appears in the above-identified patent and that said Letters Patent is hereby corrected as shown below:

In column 14, line 25, in claim 13, delete "a" and insert -- an --, therefor.

Signed and Sealed this
Twenty-sixth Day of April, 2011

David J. Kappos
*Director of the United States Patent and Trademark Office*